US011777684B2

(12) United States Patent
Tang et al.

(10) Patent No.: US 11,777,684 B2
(45) Date of Patent: Oct. 3, 2023

(54) INFORMATION TRANSMISSION METHOD, NETWORK DEVICE AND TERMINAL DEVICE

(71) Applicant: Guangdong OPPO Mobile Telecommunications Corp., Ltd., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 76 days.

(21) Appl. No.: 16/470,939

(22) PCT Filed: Dec. 23, 2016

(86) PCT No.: PCT/CN2016/111838
§ 371 (c)(1),
(2) Date: Jun. 18, 2019

(87) PCT Pub. No.: WO2018/112934
PCT Pub. Date: Jun. 28, 2018

(65) Prior Publication Data
US 2020/0092064 A1    Mar. 19, 2020

(51) Int. Cl.
*H04L 5/00* (2006.01)
*H04W 72/0446* (2023.01)
(Continued)

(52) U.S. Cl.
CPC .......... *H04L 5/0053* (2013.01); *H04L 5/0007* (2013.01); *H04L 5/0094* (2013.01);
(Continued)

(58) Field of Classification Search
CPC ... H04L 5/0053; H04L 5/0094; H04L 5/0007; H04W 72/042; H04W 72/0446; H04W 72/0406; H04W 72/00; H04W 72/0453
See application file for complete search history.

(56) References Cited

U.S. PATENT DOCUMENTS

2011/0080883 A1    4/2011 Prakash et al.
2013/0003577 A1    1/2013 Gupta et al.
(Continued)

FOREIGN PATENT DOCUMENTS

CL    2018001451 A1    7/2018
CL    2019000193 A1    4/2019
(Continued)

OTHER PUBLICATIONS

English Translation of Russian Office Action for Russian Patent Application No. 2019121989 dated Apr. 21, 2020.
(Continued)

*Primary Examiner* — Abdelillah Elmejjarmi
(74) *Attorney, Agent, or Firm* — Young Basile Hanlon & MacFarlane, P.C.

(57) ABSTRACT

A method for transmitting information, a network device and a terminal device are provided. The method includes: a network device sends first configuration information to a terminal device through a first control channel on a first carrier, wherein the first configuration information is used for indicating a configuration on a second carrier, and the first carrier and the second carrier are different.

4 Claims, 15 Drawing Sheets

(51) Int. Cl.
  H04W 72/0453 (2023.01)
  H04W 72/23 (2023.01)
(52) U.S. Cl.
  CPC ... *H04W 72/0446* (2013.01); *H04W 72/0453* (2013.01); *H04W 72/23* (2023.01)

(56) References Cited

U.S. PATENT DOCUMENTS

| | | | |
|---|---|---|---|
| 2013/0215842 | A1 | 8/2013 | Han et al. |
| 2013/0343311 | A1* | 12/2013 | Tee ................ H04L 5/0094 370/329 |
| 2014/0086117 | A1* | 3/2014 | Zhang ............... H04J 3/1694 370/280 |
| 2015/0304993 | A1 | 10/2015 | Shimezawa et al. |
| 2016/0191221 | A1 | 6/2016 | Fukuta et al. |
| 2016/0374084 | A1 | 12/2016 | Zhang |
| 2018/0167904 | A1* | 6/2018 | Lee .................... H04W 72/042 |
| 2019/0182833 | A1* | 6/2019 | Li ....................... H04L 1/1887 |
| 2019/0246426 | A1* | 8/2019 | Kim ................. H04W 72/0453 |
| 2019/0320450 | A1* | 10/2019 | Li ....................... H04L 1/1819 |

FOREIGN PATENT DOCUMENTS

| | | |
|---|---|---|
| CL | 2019000803 A1 | 6/2019 |
| CL | 2019000817 A1 | 6/2019 |
| CN | 102026375 A | 4/2011 |
| CN | 102088433 A | 6/2011 |
| CN | 102149208 A | 8/2011 |
| CN | 102265677 A | 11/2011 |
| CN | 102461301 A | 5/2012 |
| CN | 102668438 A | 9/2012 |
| CN | 102685891 A | 9/2012 |
| CN | 102905379 A | 1/2013 |
| CN | 104010373 A | 8/2014 |
| CN | 104054378 A | 9/2014 |
| CN | 104348602 A | 2/2015 |
| CN | 104469950 A | 3/2015 |
| CN | 104509194 A | 4/2015 |
| CN | 104936298 A | 9/2015 |
| CN | 105391517 A | 3/2016 |
| CN | 106231677 A | 12/2016 |
| JP | 2012508483 A | 4/2012 |
| JP | 2015133635 A | 7/2015 |
| JP | 2015523745 A | 8/2015 |
| JP | 2016503970 A | 2/2016 |
| JP | 2017510175 A | 4/2017 |
| KR | 20110084976 A | 7/2011 |
| RU | 2601738 C2 | 11/2016 |
| TW | I475910 B | 3/2015 |
| WO | 2015020018 A1 | 2/2015 |
| WO | 2015124112 A1 | 8/2015 |
| WO | 2016018046 A1 | 2/2016 |
| WO | 2018112934 A1 | 6/2018 |

OTHER PUBLICATIONS

English Translation of Chilean Office Action for Chilean Patent Application No. 201901662 dated Mar. 11, 2020.
English Translation of Chinese Office Action for Chinese Patent Application No. 201680091850.4 dated Apr. 1, 2020.
Brazil Office Action with English Translation for BR Application BR112019012437-3 dated Sep. 11, 2020.
European Examination Report for European Application No. 16924530.5 dated Dec. 9, 2020.
Japanese Office Action and English Translation for Japanese Application No. 2019-532709 dated Jan. 26, 2021; pp. 1-11.
Singapore Written Opinion for Singapore Application No. 11201905618P dated Feb. 22, 2021; pp. 1-7.
India First Examination Report for India Application No. 201917023955 dated Jan. 29, 2021; pp. 1-6.
Extended European search report issued in corresponding European application No. 16924530.5 dated Oct. 17, 2019.
English translation of Singapore Written Opinion for Singapore Patent Application No. 11201905618P dated Jun. 2, 2020; pp. 1-8.
3GPP TSG RAN WG1 Meeting #87; R1-1611656; Reno, USA, Nov. 14-18, 2016; Email discussion [86b-23] on multi-steps DL control channel design; pp. 1-14.
3GPP TSG RAN WG1 Meeting #87; R1-1611202;Reno, USA, Nov. 14-18, 2016; DL control channels for CA and DC; pp. 1-3.
Chile Second Office Action for Chile Patent Application No. 201901662 dated Jun. 12, 2020.
Canadian Offcie Action for Canadian Patant Application No. 3.047,658 dated Aug. 4, 2020.
English Translation of Second Chinese Office Action for Chinese Application No. 201680091850.4 dated Jul. 15, 2020.
Taiwan Examination Report with English Translation for TW Application 11020848480 dated Sep. 8, 2021.
Israel Second Examination Report with English Translation for IL Application 267551 dated Jul. 4, 2021.
Indonesia Examination Report with English Translation for ID Application P00201906074 dated Jun. 28, 2021.
Chili Resolution of Rejection with English Translation for CL Application 2019001662 dated Jul. 30, 2021.
Canadian Second Examination Report for CA Application 3047658 dated Jun. 30, 2021.
Australian Second Examination Report for AU Application 2016433342 dated Aug. 31, 2021.
Qualcomm Incorporated, NR LTE Coexistence Consideration, 3GPP TSG-RAN WG1 #90, R1-1713477, Aug. 21-25, 2017. (5 pages).
Japanese Notice of Reasons for Refusal with English Translation for JP Application 2019-532709 dated Sep. 28, 2021. (9 pages).
Australian Examination Report No. 2 for AU Application 2016433342 dated Jan. 6, 2022. (4 pages).
Communication pursuant to Article 94(3) EPC for EP Application 16924530.5 dated Feb. 15, 2022. (7 pages).
Singapore Notice of Eligibility for Grant for SG Application 11201905618P dated Jan. 5, 2022. (6 pages).
Japanese Office Action with English Translation for JP Application 2019532709 dated Apr. 18, 2022. (4 pages).
Japanese Decision to Grant a Patent with English Translation for JP Application 2019532709 dated Jun. 6, 2022. (5 pages).
Israel second Office Action with English Translation for IL Application 267551 dated Mar. 29, 2022. (4 pages).
Chinese First Office Action with English Translation for CN Application 202011450128.X, dated Jun. 15, 2022. (18 pages).
Mexican First Substantive Examination requirement is reported with English Translation for MX Application MXa2019007149 dated Jun. 20, 2022. (10 pages).
Vietnam First Office Action with English Translation for VN Application 1201903583 dated Jun. 30, 2022. (4 pages).
Chinese Decision on Rejection with English Translation for CN Application 202011450128.X dated Dec. 13, 2022. (13 pages).
Chinese Second Office Action with English Translation for CN Application 202011450128.X, dated Sep. 20, 2022. (16 pages).
3GPP TSG RAN WG1 Meeting #87 Reno, USA, R1-1612190, CMCC, Discussion on DCI contents for NR PDCCH, Nov. 14-18, 2016. (3 pages).
Korean Office Action with English Translation for KR Application 1020197017493 dated Jul. 21, 2023. (08 pages).
Chile Office Action with English Translation for CL Application 2019001662 dated May 9, 2023. (6 pages).
Communication pursuant to Article 94(3) EPC for EP Application 16924530.5 dated Apr. 28, 2023. (7 pages).
Malaysian Examination Report for MY Application PI2019003517 dated Jun. 27, 2023. (2 pages).

* cited by examiner

INFORMATION TRANSMISSION METHOD, NETWORK DEVICE AND TERMINAL DEVICE

CROSS-REFERENCE TO RELATED APPLICATION(S)

This application is a 371 application of International Application No. PCT/CN2016/111838, filed on Dec. 23, 2016, the entire disclosure of which is hereby incorporated by reference.

TECHNICAL FIELD

Implementations of the present disclosure relate to the communication field, and more particularly, to a method for transmitting information, a network device, and a terminal device.

BACKGROUND

At present, a Long Term Evolution Advanced (LTE-A) communication system supports Carrier Aggregation (CA) function and supports cross-carrier scheduling between Component Carriers (CCs), that is, scheduling data channels of other carriers through a control channel of a carrier.

In the Fifth generation mobile communication technology (5G) CA system, a cross-carrier scheduling technology which is similar to that in the LTE-A is introduced. However, when 5G CA system adopts the cross-carrier scheduling technology which is similar to that in the LTE-A, there will be some problems. Specifically, the bandwidth of 5G system is much larger than that of the LTE-A, and a control channel responsible for data scheduling is much more complex than that in the LTE-A system, which may include a two-layer structure of a common control channel and a UE-specific control channel. If a complete common control channel and a UE-specific control channel are sent in each carrier, the overhead of control channels may be very large, and adopting cross-carrier scheduling will excessively increase the burden of a control channel of the main carrier. Based on this, it is urgent to put forward a method to solve this problem.

SUMMARY

Implementations of the present disclosure provide a method for transmitting information, a network device, and a terminal device.

In a first aspect, a method for transmitting information is provided, which includes: sending, by a network device, first configuration information to a terminal device through a first control channel on a first carrier, wherein the first configuration information is used for indicating a configuration on a second carrier, and the first carrier and the second carrier are different.

In an implementation of the present disclosure, the first configuration information may indicate various configuration information of resources of the second carrier, such as slot structure information, reserved resources, and resource pool information. It should be understood that the first configuration information may include various configuration information of the resources of the second carrier, and this is not restricted in the present disclosure.

In some possible implementation modes, the first control channel may be a common control channel and the second control channel may be a UE-specific control channel. That is, the network device may indicate relevant configuration of the UE-specific control channel on the second carrier through the common control channel on the first carrier.

In some possible implementation modes, the first configuration information may include at least one of serial number information of a time domain scheduling unit in which the second control channel is located, information of a resource used by the second control channel, and information of a numerology used by the second control channel.

In some possible implementation modes, the first control channel and the second control channel may adopt different carriers.

Optionally, the numerology adopted by the second control channel may be indicated in the information of a resource used by the second control channel, or it may be indicated by a network device through other implicit forms.

In some possible implementation modes, the first configuration information is resource configuration information of resources on the second carrier.

Optionally, the first configuration information may include: at least one of structural information of a time domain scheduling unit within the resources of the second carrier, reserved resource information of the resources of the second carrier, and resource pool information within the resources of the second carrier.

Optionally, the first configuration information may include structural information of a time domain scheduling unit within time-frequency resources of the second carrier, where the structure of the time domain scheduling unit within the resources of the second carrier may include information of an uplink resource part, a downlink resource part, or a length of a protection period GAP, etc.

It should be understood that the information included in the first configuration information may be sent through the same configuration information or may be sent in different configuration information, and this is not restricted in the present disclosure.

In some possible implementation modes, the first control channel may further carry indication information used for indicating a serial number of a time domain scheduling unit corresponding to the first configuration information.

In a second aspect, a method for transmitting information is provided, which includes: sending, by a network device, first configuration information to a terminal device through system information on a first carrier, wherein the first configuration information is used for indicating a configuration on a second carrier, and the first carrier and the second carrier are different.

In an implementation of the present disclosure, system information may be understood as system broadcast information.

In some possible implementation modes, the first configuration information is configuration information of the control channel on the second carrier.

In some possible implementation modes, the first configuration information includes at least one of serial number information of a time domain scheduling unit in which the control channel is located, information of a resource used by the control channel, and information of a carrier used by the control channel.

In some possible implementation modes, the time domain scheduling unit includes a time slot, a mini-slot, or a sub-frame.

In some possible implementation modes, the first configuration information is resource allocation information of resources on the second carrier.

In some possible implementation modes, the first configuration information may include at least one of structure information of a time domain scheduling unit within resources of the second carrier, reserved resource information of resources of the second carrier, and resource pool information of resources of the second carrier.

In some possible implementation modes, the system information carries indication information used for indicating a serial number of a time domain scheduling unit corresponding to the first configuration information.

In a third aspect, a method for transmitting information is provided, which includes: receiving, by a terminal device, first configuration information sent by a network device through a first control channel on a first carrier, wherein the first configuration information is used for indicating a configuration on a second carrier, and the first carrier and the second carrier are different.

In some possible implementation modes, the first configuration information is configuration information of a second control channel on the second carrier.

In some possible implementation modes, the first control channel is a common control channel and the second control channel is a UE-specific control channel of the terminal device.

In some possible implementation modes, the first configuration information includes at least one of serial number information of a time domain scheduling unit in which the second control channel is located, information of a resource used by the second control channel, and information of a numerology used by the second control channel.

In some possible implementation modes, the first configuration information is resource configuration information of resources of the second carrier.

In some possible implementation modes, the first configuration information may include at least one of structure information of a minimum time domain scheduling unit within resources of the second carrier, reserved resource information of resources of the second carrier, and resource pool information of resources of the second carrier.

In some possible implementation modes, the first control channel carries indication information used for indicating a number of a time domain scheduling unit corresponding to the first configuration information.

In some possible implementation modes, the time domain scheduling unit includes a time slot, mini-slot, or a subframe.

In some possible implementation modes, the first control channel and the second control channel adopt different carriers.

In some possible implementation modes, the numerology used by the second control channel includes at least one of following parameters: a subcarrier interval, a width of minimum frequency domain scheduling unit, a length of orthogonal frequency division multiplexing (OFDM) symbol, a length of minimum time domain scheduling unit, and a length of Cyclic Prefix (CP).

In a fourth aspect, a method for transmitting information is provided, which includes: receiving, by a terminal device, first configuration information sent by a network device through system information on a first carrier, wherein the first configuration information is used for indicating a configuration on a second carrier, and the first carrier and the second carrier are different.

In some possible implementation modes, the first control channel is a common control channel and the second control channel is a UE-specific control channel of the terminal device.

In some possible implementation modes, the first configuration information includes at least one of serial number information of a time domain scheduling unit in which the second control channel is located, information of a resource used by the second control channel, and information of a numerology used by the second control channel.

In some possible implementation modes, the time domain scheduling unit includes a time slot, mini-slot or a subframe.

In some possible implementation modes, the first configuration information is resource allocation information of resources of the second carrier.

In some possible implementation modes, the first configuration information may include at least one of structure information of a time domain scheduling unit within resources of the second carrier, reserved resource information of resources of the second carrier, and resource pool information of resources of the second carrier.

In some possible implementation modes, the system information carries indication information used for indicating a number of a time domain scheduling unit corresponding to the first configuration information.

In some possible implementation modes, the time domain scheduling unit includes a time slot, mini-slot, or a subframe.

In some possible implementation modes, the numerology used by the control channel includes at least one of following parameters: a subcarrier interval, a width of frequency domain scheduling unit, a length of orthogonal frequency division multiplexing (OFDM) symbol, a length of minimum domain scheduling unit, and a length of cyclic prefix (CP).

In a fifth aspect, a network device is provided for performing the method in the first aspect or any possible implementation mode of the first aspect described above. Specifically, the network device includes units for performing the method in the first aspect or any possible implementation mode of the first aspect described above.

In a sixth aspect, a network device is provided for performing the method in the second aspect or any possible implementation mode of the second aspect described above. Specifically, the network device includes units for performing the method in the second aspect or any possible implementation mode of the second aspect described above.

In a seventh aspect, a terminal device is provided for performing the method in the third aspect or any possible implementation mode of the third aspect described above. Specifically, the terminal device includes units for performing the method in the third aspect or any possible implementation mode of the third aspect described above.

In an eighth aspect, a terminal device is provided for performing the method in the fourth aspect or any possible implementation mode of the fourth aspect described above. Specifically, the terminal device includes units for performing the method in the fourth aspect or any possible implementation mode of the fourth aspect described above.

In a ninth aspect, a network device is provided. The network device includes a processor, a memory, and a communication interface. The processor is connected with the memory and the communication interface. The memory is used for storing instructions, the processor is used for executing the instructions, and the communication interface is used for communicating with other network elements under the control of the processor. When the processor executes instructions stored in the memory, the execution causes the processor to perform the method in the first aspect or any possible implementation mode of the first aspect.

In a tenth aspect, a network device is provided. The network device includes a processor, a memory, and a communication interface. The processor is connected with the memory and the communication interface. The memory is used for storing instructions, the processor is used for executing the instructions, and the communication interface is used for communicating with other network elements under the control of the processor. When the processor executes instructions stored in the memory, the execution causes the processor to perform the method in the second aspect or any possible implementation mode of the second aspect.

In an eleventh aspect, a terminal device is provided. The terminal device includes a processor, a memory, and a communication interface. The processor is connected with the memory and the communication interface. The memory is used for storing instructions, the processor is used for executing the instructions, and the communication interface is used for communicating with other network elements under the control of the processor. When the processor executes the instructions stored in the memory, the execution causes the processor to perform the method in the third aspect or any possible implementation mode of the third aspect.

In a twelfth aspect, a terminal device is provided. The terminal device includes a processor, a memory, and a communication interface. The processor is connected with the memory and the communication interface. The memory is used for storing instructions, the processor is used for executing the instructions, and the communication interface is used for communicating with other network elements under the control of the processor. When the processor executes the instructions stored in the memory, the execution causes the processor to perform the method in the fourth aspect or any possible implementation mode of the fourth aspect.

In a thirteenth aspect, a computer-readable storage medium is provided, which stores a program that causes a network device to perform any method for transmitting information in the above-described first aspect and various implementation modes of the first aspect.

In a fourteenth aspect, a computer-readable storage medium is provided, which stores a program that causes a network device to perform any method for transmitting information in the above-described second aspect and various implementation modes of the second aspect.

In a fifteenth aspect, a computer-readable storage medium is provided, which stores a program that causes a terminal device to perform any method for transmitting information in the above-described third aspect and various implementation modes of the third aspect.

In a sixteenth aspect, a computer-readable storage medium is provided, which stores a program that causes a terminal device to perform any method for transmitting information in the above-described fourth aspect and various implementation modes of the fourth aspect.

DETAILED DESCRIPTION

Technical solutions in implementations of the present disclosure are described below with reference to drawings in the implementations of the present disclosure.

It should be understood that the technical solutions of the implementations of the present disclosure may be applied to various communication systems, for example, current communication systems such as a Global System of Mobile Communication (GSM), a Code Division Multiple Access (CDMA) system, a Wideband Code Division Multiple Access (WCDMA) system, General Packet Radio Service (GPRS), a Long Term Evolution (LTE) system, an LTE Frequency Division Duplexing (FDD) system, an LTE time Division Duplex (TDD) system, and a Universal Mobile Communication system (UMTS), and especially to a future 5G system or a 5G New Radio (NR) prototype system.

It should also be understood that in the implementations of the present disclosure, a network-side device may also be referred to as a network device or a base station, etc., and the base station may be a Base Transceiver Station (BTS) in GSM or CDMA, a base station (NodeB) in WCDMA, an evolution base station (eNB or NodeB) in LTE, or a base station device in a future 5G network, etc., and this is not restricted in the present disclosure.

It should also be understood that in the implementations of the present disclosure, a terminal device may communicate with one or more Core Networks via a Radio Access Network (RAN), and the terminal device may be referred to as an access terminal, User Equipment (UE), a subscriber unit, a subscriber station, a mobile station, a mobile platform, a remote station, a remote terminal, a mobile device, a user terminal, a terminal, a wireless communication device, a user agent or a user apparatus. The terminal device may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing device connected to a wireless modem, an on-board device, a wearable device, a terminal device in a future 5G network, etc.

Figure 1:
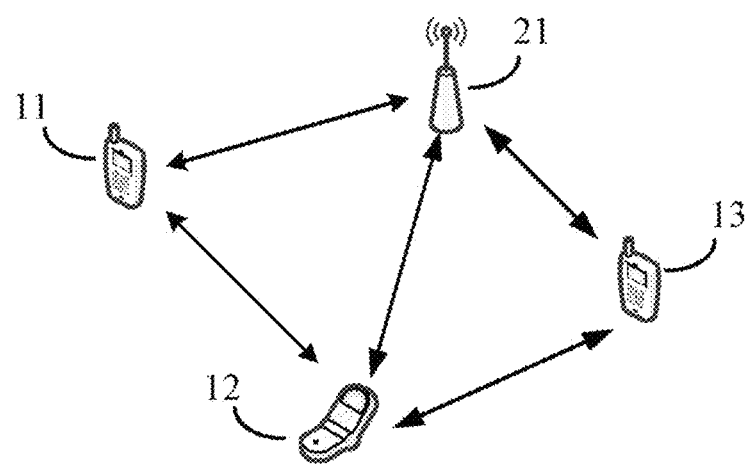
FIG. 1 is a schematic diagram of a scene.

FIG. 1 is a schematic diagram of a scene. It should be understood that the scene in FIG. 1 is introduced as an example for sake of understanding, which does not constitute a limitation on the present disclosure. In FIG. 1, a terminal device 11, a terminal device 12, a terminal device 13 and a base station 21 are shown.

As shown in FIG. 1, the terminal device 11 may communicate with the base station 21, the terminal device 12 may communicate with the base station 21, and the terminal device 13 may communicate with the base station 21. Alternatively, the terminal device 12 may communicate with the terminal device 11. Alternatively, as another case, the terminal device 13 communicates with the base station 21. Here, for the communication between the terminal device and the base station or the communication between the terminal device and the terminal device, a UE-specific control channel of the terminal device may be indicated through a Common control channel.

However, in the prior art, if the 5G CA system adopts a cross-carrier scheduling technology which is similar to that in the LTE-A, there will be some problems: the control channel responsible for data scheduling in the 5G system may be far more complex than that in LTE-A system, accordingly, the overhead of the common control channel may be larger, and a channel burden of another carrier will be increased when transmitting with the other carrier, which may result in some waste of channel resources. In addition, as the common control channel needs to broadcast to all users, it is much difficult to improve coverage capability of the common control channel by using beamforming technology, which results in a problem of insufficient coverage of the common control channel on high-frequency carriers. In addition, correspondingly, the terminal device further needs to search for the common control channel at multiple positions, thus the complexity of the terminal device is increased and the power consumption of the terminal device is relatively large.

Therefore, the network device or terminal device in the implementation of the present disclosure tries to indicate control information of other multiple carriers (such as a UE-specific control channel) through a common control channel of a carrier, so as to save the overhead of the common control channel. Furthermore, the problem of insufficient coverage of common control channel on high-frequency carriers can be improved.

Figure 2:
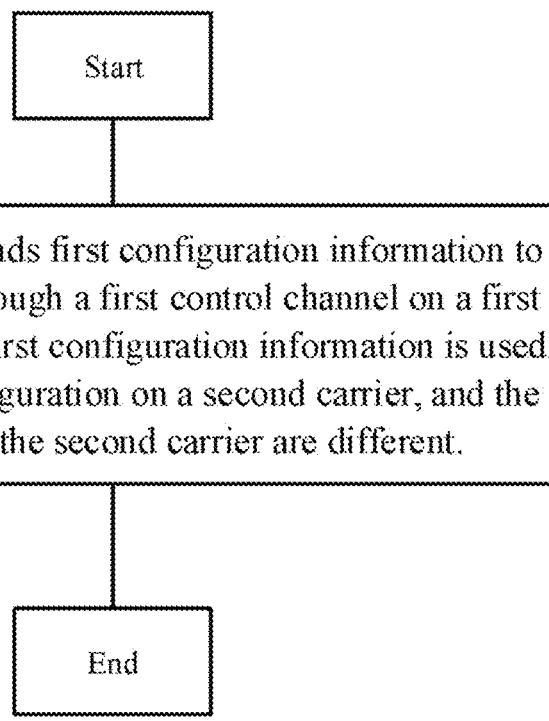
FIG. 2 is a schematic flowchart of a method for transmitting information according to an implementation of the present disclosure.

FIG. 2 shows a schematic flowchart of a method 200 for transmitting information according to an implementation of the present disclosure. The method 200 may be performed by a network device, for example, the network device may be the base station 21 in FIG. 1. As shown in FIG. 2, the method 200 includes the act S210.

In S210, a network device sends first configuration information to a terminal device through a first control channel on a first carrier, wherein the first configuration information is used for indicating a configuration on a second carrier, and the first carrier and the second carrier are different.

Specifically, the network device may indicate configuration information of resources of other carriers (such as the second carrier) through a channel (such as the first control channel) on the first carrier, and send relevant configuration information (such as the first configuration information) to the terminal device. In this way, the network device does not need to transmit a common control channel on each carrier, and the overhead of the common control channel is saved. Correspondingly, the terminal device may receive the first configuration information sent by the network device through the first control channel of a carrier to obtain configuration information of multiple carriers, so as to avoid a detection of the common control channel on the multiple carriers, reduce the complexity of the terminal device and save the power of the terminal device.

Here, the first carrier and the second carrier are different carriers, such as a low-frequency carrier and a high-frequency carrier. For example, with the method for transmitting information according to the implementation of the present disclosure, the problem of insufficient coverage of a common control channel on the high-frequency carriers can be solved by sending the configuration information of the high-frequency carriers through the common control channel on the low-frequency carrier. Therefore, with the technical solution of the implementation of the present disclosure, the coverage capability of the common control channels on the high-frequency carriers can be further equivalently improved.

In an implementation of the present disclosure, the first configuration information may indicate various configuration information of resources of the second carrier, such as slot structure information, reserved resources, and resource pool information. It should be understood that the first configuration information may include various configuration information of the resources of the second carrier, which are not restricted in the present disclosure.

Optionally, as an implementation, the first configuration information may be configuration information of a second control channel of resources of the second carrier. In other words, the first configuration information may indicate a related configuration of the second control channel of time-frequency resources of the second carrier.

Optionally, the first control channel may be a common control channel and the second channel may be a UE-specific control channel. That is, the network device may indicate the relevant configuration of the UE-specific control channel on the second carrier through the common control channel on the first carrier.

Optionally, the first configuration information may include at least one of serial number information of a time domain scheduling unit in which the second control channel is located, information of a resource used by the second control channel, and information of a numerology used by the second control channel.

Optionally, in an implementation of the present disclosure, the time domain scheduling unit may be specifically a time slot, a mini-slot, or a sub-frame.

In an implementation of the present disclosure, the first control channel and the second control channel may adopt different carriers. That is, the carrier adopted by the common control channel and the carrier adopted by the UE-specific control channel of the terminal may be different.

Optionally, the numerology adopted by the second control channel may be indicated in the information of a resource used by the second control channel, or it may also be indicated by the network device through other implicit forms.

Therefore, in the method for transmitting information according to the implementation of the present disclosure, the network device sends first configuration information to the terminal device through the first control channel on the first carrier, wherein the first configuration information is used for indicating the configuration on the second carrier, and the first carrier and the second carrier are different, and the overhead of the common control channel can be saved.

Optionally, as an implementation, the first configuration information may be configuration information of resources on the second carrier.

Optionally, the first configuration information may include: at least one of structural information of a time domain scheduling unit within resources of the second carrier, reserved resource information of resources of the second carrier, and resource pool information of resources of the second carrier.

For example, the first configuration information may include structural information of a time domain scheduling unit within time-frequency resources of the second carrier, wherein, the structure of the time domain scheduling unit within the resources of the second carrier may include information such as an uplink resource part, a downlink resource part, or a length of a protection period GAP.

Alternatively, for another example, the first configuration information may include reserved resource information of the time-frequency resources of the second carrier.

Alternatively, for another example, the first configuration information may include resource pool information within the time-frequency resources of the second carrier.

It should be understood that the above only shows some examples of the first configuration information, and there may be more forms of combination in specific implementations, or the first configuration information may further include other reasonable configuration information, and this is not restricted in the present disclosure.

The above describes related examples of the first configuration information. Optionally, the first control channel may further carry indication information used for indicating a serial number of a time domain scheduling unit corresponding to the first configuration information.

That is, when the network device sends the configuration information through the first control channel, that the configuration information is to be sent to which time domain scheduling unit (such as to which sub-frame, time slot or mini-slot) may further be specified. In specific implementation, the network device may indicate the time domain scheduling unit corresponding to the configuration information to the terminal device by carrying the serial number of the time domain scheduling unit in the first configuration information. Alternatively, if several mini-slots are connected in series to form a time slot, a serial number of each mini-slot in the time slot may also be indicated, and this is not restricted in the present disclosure.

It should be understood that in an implementation of the present disclosure, the first configuration information is only taken as an example for explanation, and multiple pieces of configuration information may be introduced in practice, and this is not restricted in the present disclosure.

It should also be understood that the information included in the first configuration information may be sent through the same configuration information or may be sent in different configuration information, and this is not restricted in the present disclosure.

It should also be understood that in implementations of the present disclosure, the introduction of the serial numbers "first" and "second" . . . is only used for distinguishing different objects, for example, to distinguish different "channels" or to distinguish different "carriers", which does not constitute limitation on the present disclosure.

Figure 3A:
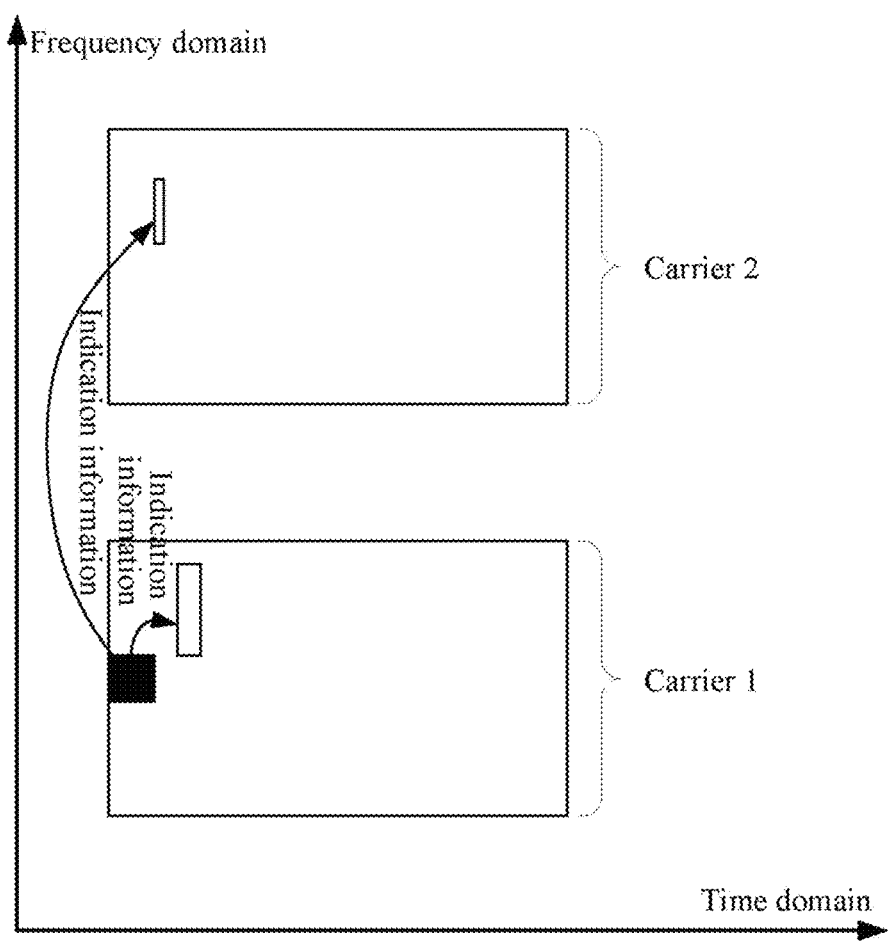
FIG. 3A is a schematic diagram of an example according to an implementation of the present disclosure.

A method for transmitting information according to an implementation of the present disclosure will be described below with reference to an example in FIG. 3A. As shown in FIG. 3A, ▌ represents a common control channel on carrier 1, and ☐ represents a UE-specific control channel. Here, the common control channel on carrier 1 may be understood as the first control channel described above. The network device may indicate the UE-specific control channel on other carrier (such as carrier 2) through the common control channel on carrier 1. Of course, the network device may also indicate the UE-specific control channel on carrier 1 through the common control channel on carrier 1. Each of multiple pieces of indication information shown in FIG. 3A may be understood as the first configuration information described above. Optionally, the network device may further indicate other configuration information (not shown) on carrier 1 and carrier 2 in FIG. 3A, which are not restricted in the present disclosure.

Therefore, with the method for transmitting information according to the implementation of the present disclosure, it is not needed to transmit a common control channel on each carrier, thus the overhead of the common control channel may be obviously saved. Correspondingly, the terminal device may receive the first configuration information sent by the network device through the first control channel of a carrier to obtain configuration information of multiple carriers, so as to avoid a detection of a common control channel on the multiple carriers, reduce the complexity of the terminal device, and save the power of the terminal device.

Figure 3B:
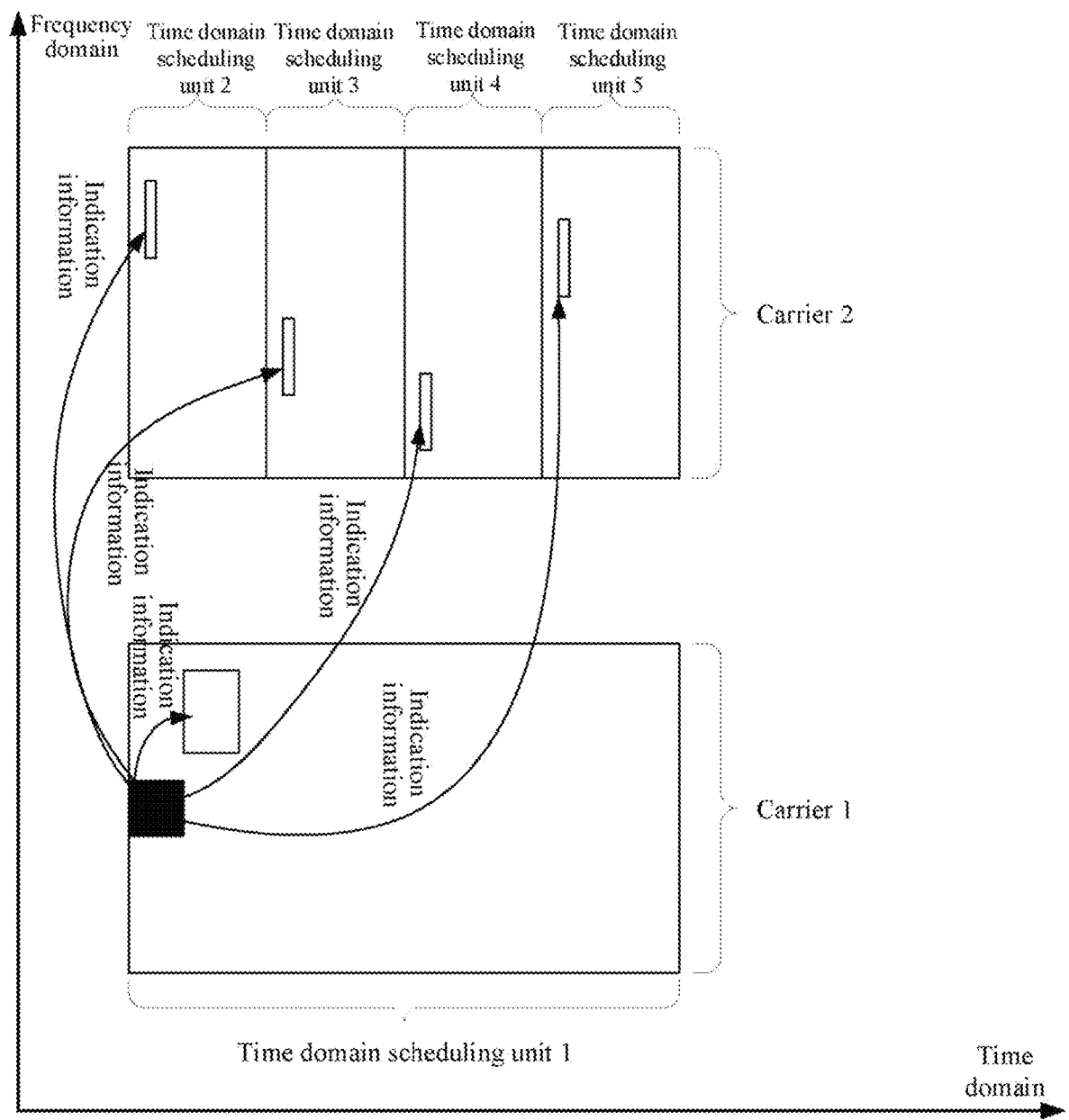
FIG. 3B is a schematic diagram of another example according to an implementation of the present disclosure.

In the following, a method for transmitting information according to an implementation of the present disclosure will be described with reference to an example in FIG. 3B, some similar concepts in FIG. 3B and FIG. 3A will not be described in detail for sake of conciseness. As shown in FIG. 3B, ▌ represents a common control channel on carrier 1, and ☐ represents a UE-specific control channel such as UE-specific control channels corresponding to multiple time-frequency units on carrier 2. The network device may indicate the UE-specific control channels of multiple time-frequency scheduling units (such as time-frequency scheduling unit 2, time-frequency scheduling unit 3, time-frequency scheduling unit 4, and time-frequency scheduling unit 5) on carrier 2 through the common control channel on carrier 1. Optionally, multiple pieces indication information in FIG. 3B may be understood as the first configuration information previously mentioned.

Figure 4A:
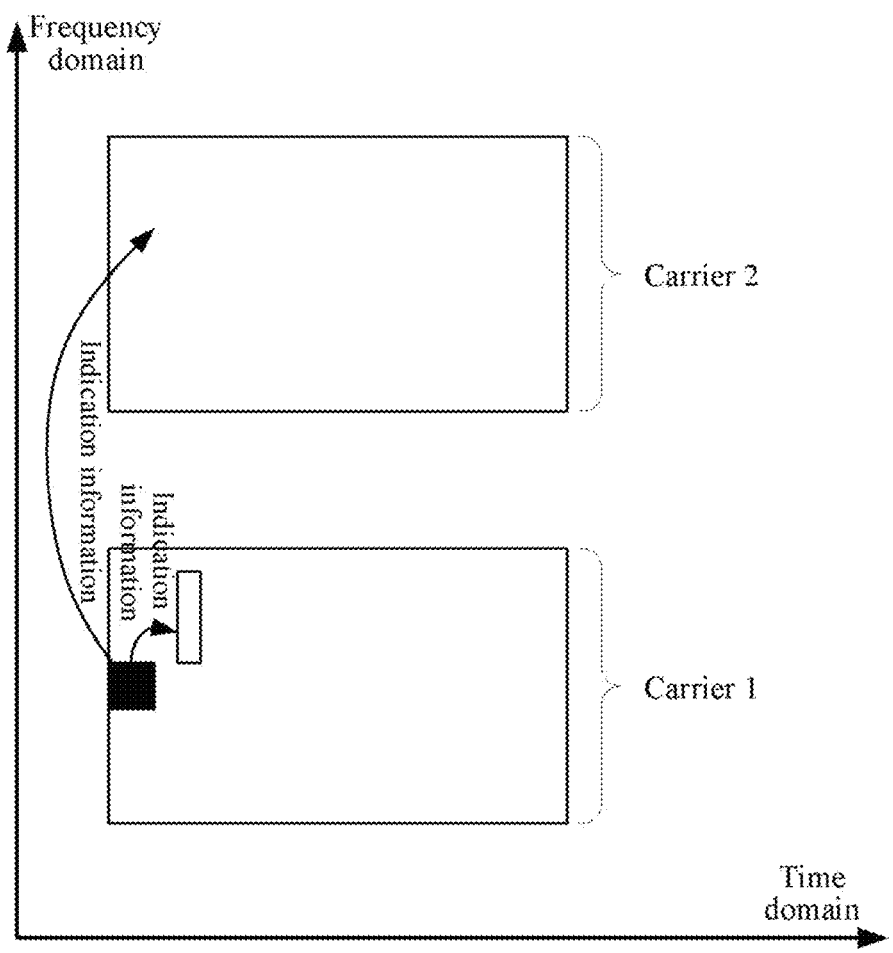
FIG. 4A is a schematic diagram of an example according to an implementation of the present disclosure.

In the following, a method for transmitting information according to an implementation of the present disclosure will be described with reference to an example in FIG. 4A. As shown in FIG. 4A, ▌ represents a common control channel on carrier 1. In FIG. 4A, other various configuration information on carrier 2, which is not limited to a UE-specific control channel, may be indicated by the network device through the common control channel on carrier 1. Optionally, the indication information in FIG. 4A may be understood as the first configuration information previously mentioned.

Figure 4B:
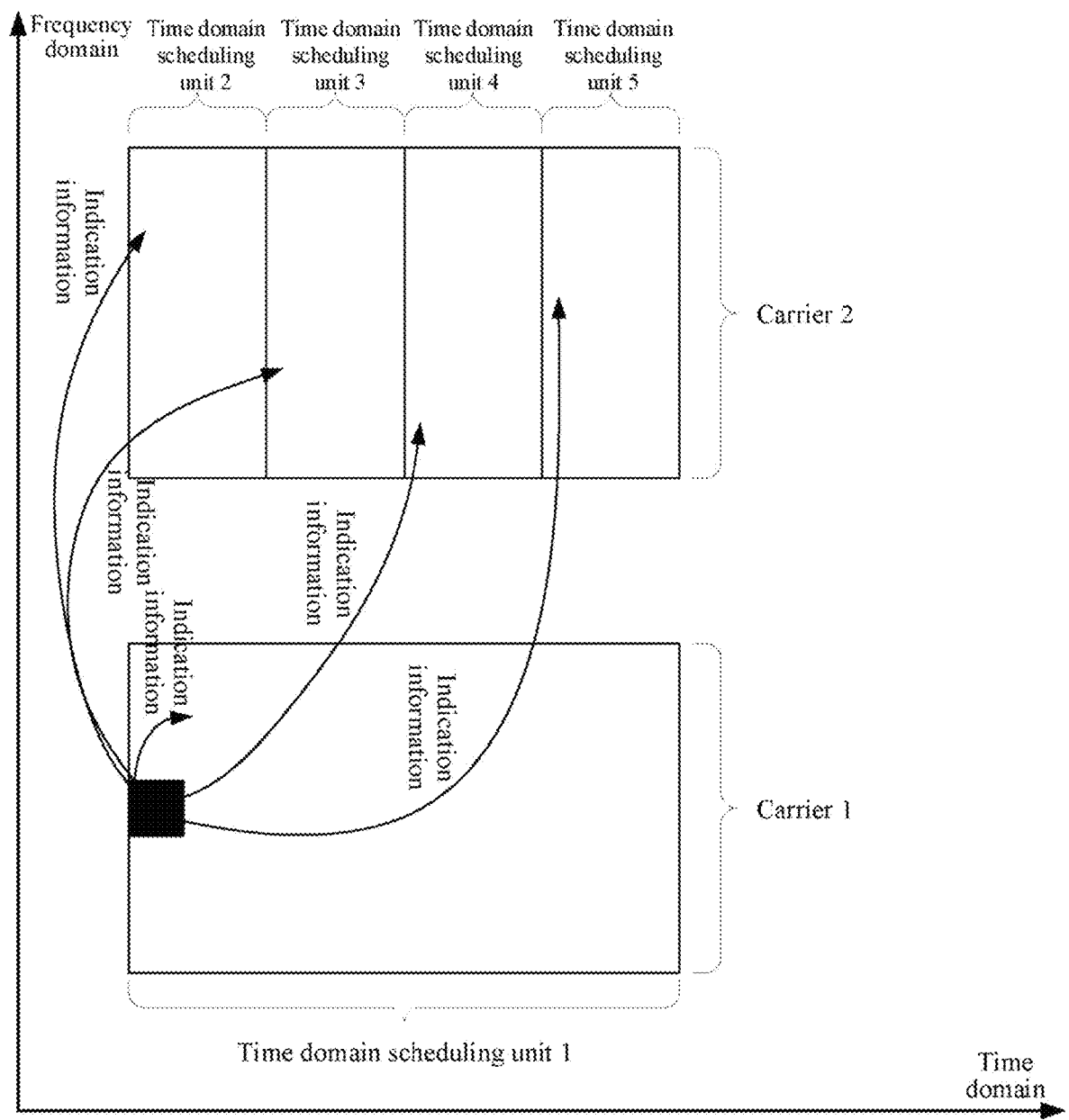
FIG. 4B is a schematic diagram of another example according to an implementation of the present disclosure.

In the following, a method for transmitting information according to an implementation of the present disclosure will be described with reference to an example in FIG. 4B. As shown in FIG. 4B, ▌ represents a common control channel on carrier 1. In FIG. 4B, other various configuration information in each time-frequency scheduling unit (such as time-frequency scheduling unit 2, time-frequency scheduling unit 3, time-frequency scheduling unit 4, and time-frequency scheduling unit 5) on carrier 2, which is not limited to a UE-specific control channel, may be indicated by the network device through the common control channel on carrier 1. Optionally, various indication information in FIG. 4B may be understood as the first configuration information previously mentioned.

It should be understood that the examples in FIG. 3A, FIG. 3B, FIG. 4A and FIG. 4B are introduced herein only for the convenience of understanding the technical solutions of implementations of the present disclosure by those skilled in the art, which does not constitute limitation on the present disclosure.

Figure 5:
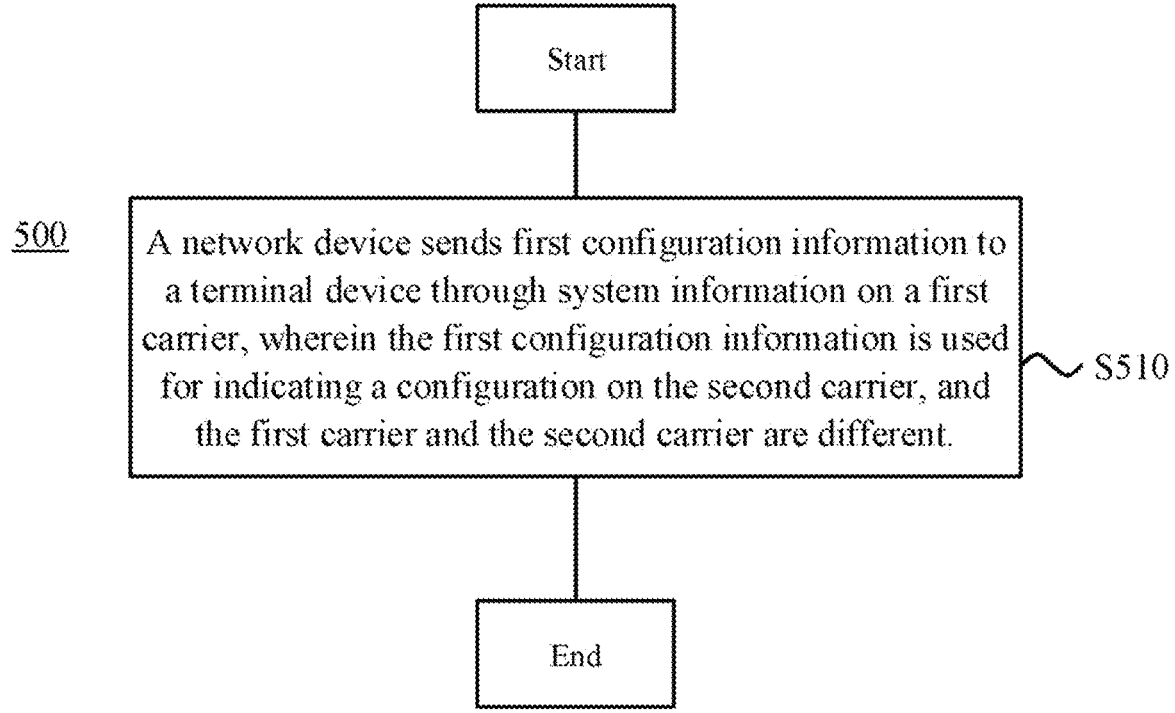
FIG. 5 is a schematic flowchart of a method for transmitting information according to another implementation of the present disclosure.

In the following, a method for transmitting information according to another implementation of the present disclosure will be described with reference to FIG. 5. FIG. 5 shows an illustrative flow chart of a method 500 for transmitting information according to another implementation of the present disclosure. The method 500 may be performed by a network device, for example, the network device may be the base station 21 in FIG. 1. As shown in FIG. 5, the method 500 includes the act S510.

In S510, a network device sends first configuration information to a terminal device through system information on a first carrier, wherein the first configuration information is used for indicating a configuration on the second carrier, and the first carrier and the second carrier are different.

In an implementation of the present disclosure, the system information may be understood as system broadcast information.

The difference from the previous implementations is that, in this implementation, the first control channel and the second control channel are not distinguished, but the related configuration information is sent to the terminal device through the system information. Alternatively, it may also be understood that the "system information" in the implementation of the present disclosure may correspond to the "first control channel" in the preceding method 200, and the "control channel" in the implementation of the present disclosure may correspond to the "second control channel" in the preceding method 200.

Specifically, the network device may send the first configuration information to the terminal device through the system information on the first carrier, wherein the first configuration information is used for indicating the configuration on the second carrier, and the first carrier is different from the second carrier. In this way, the network device does not need to send all of system information on each carrier, which saves the overhead of the system information. Correspondingly, the terminal device may receive the first configuration information sent by the network device through the system information on the first carrier, so as to obtain configurations of multiple carriers according to the first configuration information, thus avoiding the detection of the system information of the multiple carriers, reducing the complexity of the terminal device, and saving the power of the terminal device.

Optionally, as an implementation, the first configuration information is configuration information of a control channel on the second carrier.

Optionally, as an implementation, the first configuration information includes at least one of serial number information of a time domain scheduling unit in which the control channel is located, information of a resource used by the control channel, and information of a numerology used by the control channel.

Optionally, as an implementation, the time domain scheduling unit includes a time slot, mini-slot, or a sub-frame.

Optionally, as an implementation, the first configuration information may be resource allocation information of resources on the second carrier.

Optionally, as an implementation, the first configuration information may include at least one of structure information of a time domain scheduling unit within resources of the second carrier, reserved resource information of resources of the second carrier, and resource pool information of resources of the second carrier.

Optionally, as an implementation, the system information carries indication information used for indicating a serial number of a time domain scheduling unit corresponding to the first configuration information.

Here, concepts or terms appeared in this implementation are similar to those in the previous implementation, and will not be repeated for sake of conciseness.

Therefore, with the method for transmitting information according to the implementation of the present disclosure, the network device sends the first configuration information to the terminal device through system information on the first carrier, wherein the first configuration information is used for indicating the configuration on a second carrier, and the first carrier is different from the second carrier, the network device does not need to send all of system information on each carrier, thus saving the overhead of the system information.

Figure 6A:
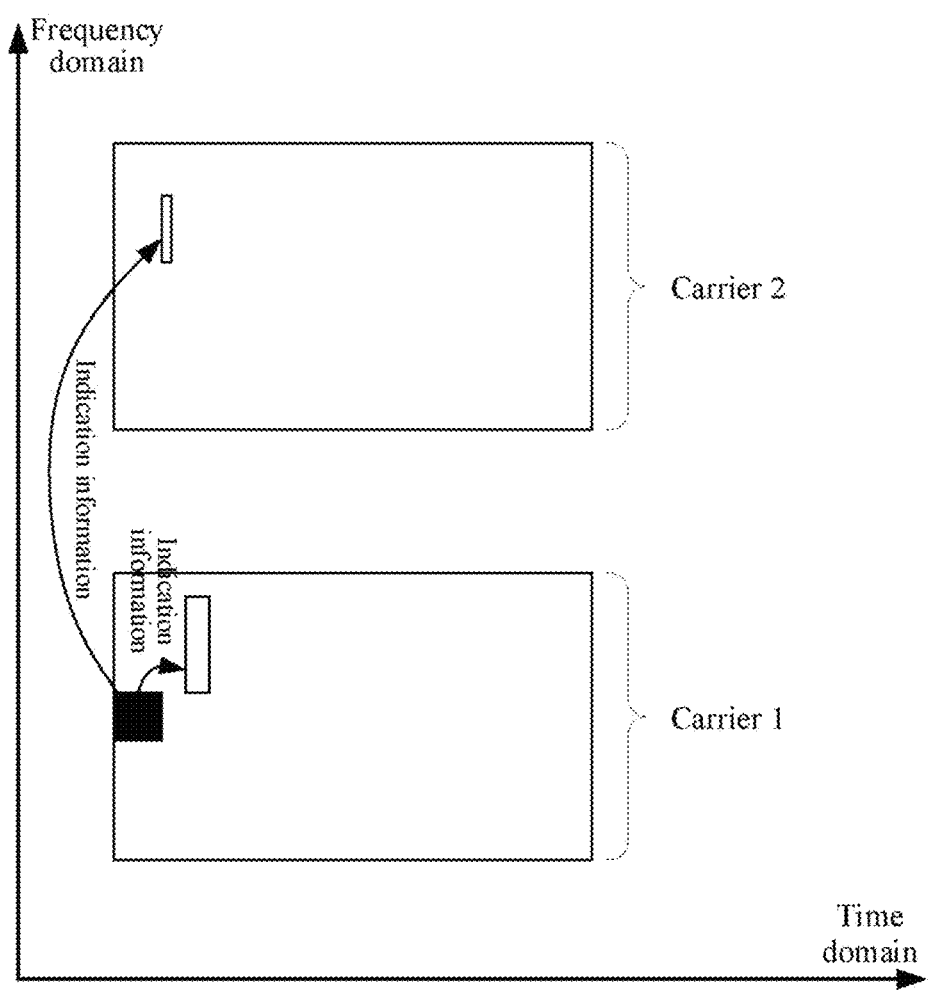
FIG. 6A is a schematic diagram of an example according to another implementation of the present disclosure.

Now, a method for transmitting information according to an implementation of the present disclosure will be described with reference to an example in FIG. 6A. As shown in FIG. 6A, ▌ represents system broadcast information (located within the resources of carrier 1) and □ represents a control channel corresponding to each carrier (such as carrier 1 and carrier 2). Here, the network device may transmit control channels of other carriers (such as carrier 1 and carrier 2) to the terminal device through system broadcast information. Optionally, the network device may further send other configuration information (such as the first configuration information) to the terminal device through the system broadcast information, and this is not restricted in the present disclosure. Similarly, the indication information in FIG. 6A may also be understood as the first configuration information or other configuration information.

Figure 6B:
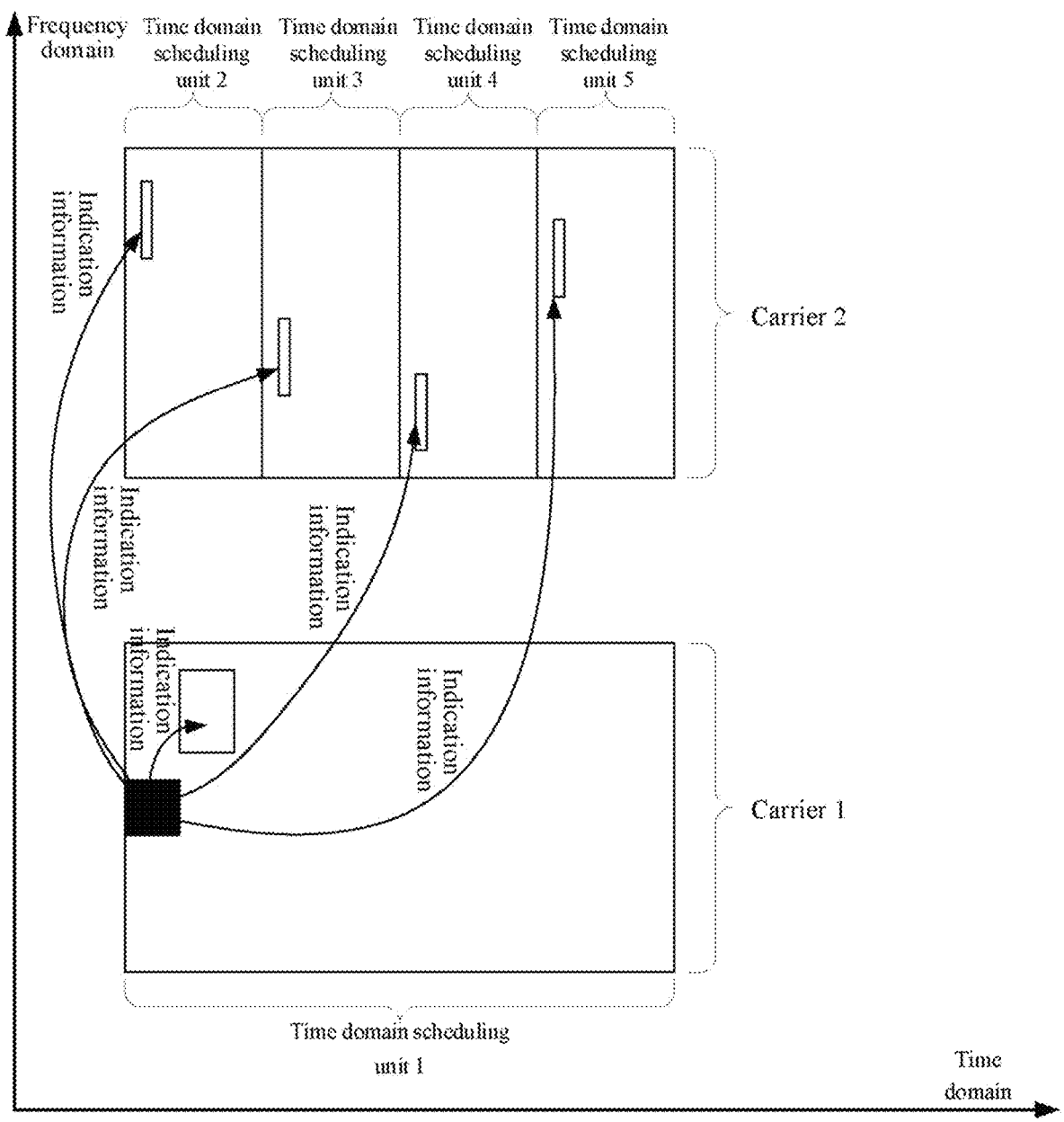
FIG. 6B is a schematic diagram of another example according to another implementation of the present disclosure.

In the following, a method for transmitting information according to an implementation of the present disclosure will be described with reference to an example in FIG. 6B. As shown in FIG. 6B, ▌ represents system broadcast information (located in the resources using subcarrier interval f1), and □ represents a control channel corresponding to a time domain scheduling unit (such as time domain scheduling unit 1, time domain scheduling unit 2, time domain scheduling unit 3, time domain scheduling unit 4, or time domain scheduling unit 5) in each carrier (such as carrier 1 or carrier 2). Here, the network device may transmit control channels of time domain scheduling units of other carriers to the terminal device through the system broadcast information. Optionally, the network device may send other configuration information (such as the first configuration information) to the terminal device through system broadcast information, and this is not restricted in the present disclosure. Similarly, multiple pieces of indication information in FIG. 6B may also be understood as the first configuration information or other configuration information.

In this example, the network device sends first configuration information (i.e., indication information) to the terminal device through system broadcast information on the first carrier, wherein the first configuration information is used for indicating the configuration within the resources of the second carrier, and the first carrier is different from the second carrier, and the overhead of common control channel can be saved.

The methods according to implementations of the present disclosure have been described above from a network device side. Next, a method according to an implementation of the present disclosure will be described from a terminal device side. For the sake of conciseness, the concepts or terms same as or similar to those on the network device side will not be repeated.

Figure 7:
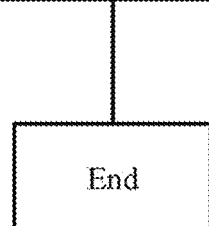
FIG. 7 is a schematic flowchart of a method for transmitting information according to an implementation of the present disclosure.

FIG. 7 shows a schematic flowchart of a method 700 for transmitting information according to an implementation of the present disclosure. The method 700 may be performed by a terminal device, for example, the terminal device may be the terminal device 11, or the terminal device 12, or the terminal device 13 in FIG. 1. The method 700 may correspond to the preceding method 200. As shown in FIG. 7, the method 700 includes the act S710.

In S710, a terminal device receives first configuration information sent by a network device through a first control channel on a first carrier, wherein the first configuration information is used for indicating a configuration on a second carrier, and the first carrier and the second carrier are different.

In an implementation of the present disclosure, the terminal device receives the first configuration information sent by the network device through the first control channel on the first carrier, wherein the first configuration information is used for indicating the configuration on the second carrier, the first carrier is different from the second carrier. The terminal device can receive the first configuration information sent by the network device through the first control channel of a carrier to obtain configuration information of multiple carriers, so as to avoid a detection of a common control channels on the multiple carriers, reduce the complexity of the terminal device, and save the power of the terminal device.

Optionally, as an implementation, the first configuration information is configuration information of a second control channel on the second carrier.

Optionally, as an implementation, the first control channel is a common control channel and the second control channel is a UE-specific control channel of the terminal device.

Optionally, as an implementation, the first configuration information includes at least one of serial number information of a time domain scheduling unit in which the second control channel is located, information of a resource used by the second control channel, and information of a numerology used by the second control channel.

Optionally, as an implementation, the first configuration information is resource configuration information of resources of the second carrier.

Optionally, as an implementation, the first configuration information includes at least one of structure information of a minimum time domain scheduling unit within resources of the second carrier, reserved resource information of resources of the second carrier, and resource pool information of resources of the second carrier.

Optionally, as an implementation, the first control channel carries indication information used for indicating a serial number of a time domain scheduling unit corresponding to the first configuration information.

Optionally, as an implementation, the time domain scheduling unit includes a time slot, a mini-slot, or a sub-frame.

Optionally, as an implementation, the numerology used by the second control channel includes at least one of the following parameters:

a subcarrier interval, a width of minimum frequency domain scheduling unit, a length of orthogonal frequency division multiplexing (OFDM) symbol, a length of minimum time domain scheduling unit, and a length of Cyclic Prefix (CP).

Therefore, the terminal device receives the first configuration information sent by the network device through the first control channel on the first carrier, wherein the first configuration information is used for indicating the configuration on the second carrier, and the first carrier and the second carrier are different, so that the overhead of common control channel can be saved, the complexity of the terminal device can be reduced, and the power of the terminal device can be saved.

Figure 8:
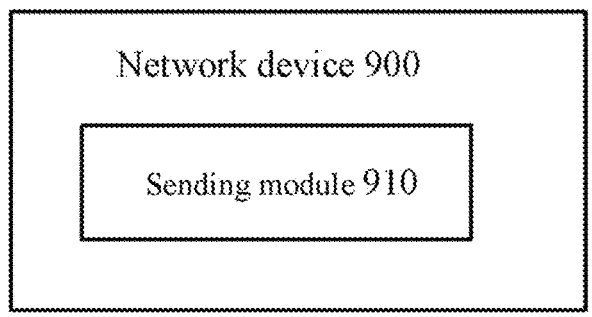
FIG. 8 is a schematic flowchart of a method for transmitting information according to another implementation of the present disclosure.

FIG. 8 shows a schematic flowchart of a method 800 for transmitting information according to an implementation of the present disclosure. The method 800 may be performed by a terminal device, for example, the terminal device may be the terminal device 11, or the terminal device 12, or the terminal device 13 in FIG. 1. The method 800 may correspond to the preceding method 500. As shown in FIG. 8, the method 800 includes the act S810.

In S810, a terminal device receives first configuration information sent by a network device through system information on a first carrier, wherein the first configuration information is used for indicating a configuration on a second carrier, and the first carrier and the second carrier are different.

In an implementation of the present disclosure, the terminal device may receive the first configuration information sent by the network device through the system information on the first carrier, so as to obtain configurations of multiple carriers according to the first configuration information, thus avoiding the detection of system information of the multiple carriers, reducing the complexity of the terminal device, and saving the power of the terminal device.

Optionally, as an implementation, the first configuration information is configuration information of a control channel on the second carrier.

Optionally, as an implementation, the first configuration information includes at least one of serial number information of a time domain scheduling unit in which the control channel is located, information of a resource used by the control channel, and information of a numerology used by the control channel.

Optionally, as an implementation, the time domain scheduling unit includes a time slot, a mini-slot, or a sub-frame.

Optionally, as an implementation, the first configuration information is resource allocation information of resources of the second carrier.

Optionally, as an implementation, the first configuration information may include at least one of structure information of a time domain scheduling unit within resources of the second carrier, reserved resource information of resources of the second carrier, and resource pool information of resources of the second carrier.

Optionally, as an implementation, the system information carries indication information used for indicating a serial number of a time domain scheduling unit corresponding to the first configuration information.

Optionally, as an implementation, the time domain scheduling unit includes a time slot, a mini-slot, or a sub-frame.

Optionally, the numerology used by the control channel includes at least one of the following parameters:

a subcarrier interval, a width of frequency domain scheduling unit, a length of orthogonal frequency division multiplexing (OFDM) symbol, a length of minimum domain scheduling unit, and a length of cyclic prefix (CP).

Therefore, the terminal device may receive the first configuration information sent by the network device through the system information on the first carrier, so as to obtain the configurations of multiple carriers according to the first configuration information, thus avoiding a detection of system information of the multiple carriers, reducing the complexity of the terminal device, and saving the power of the terminal device.

Figure 9:
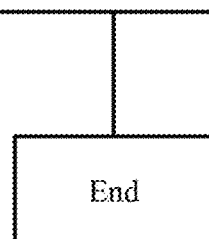
FIG. 9 is a schematic block diagram of a network device according to an implementation of the present disclosure.

Now, a network device according to an implementation of the present disclosure will be described. FIG. 9 shows a network device 900 according to an implementation of the present disclosure. As shown in FIG. 9, the network device 900 includes a sending module 910.

The sending module 910 is used for sending first configuration information to a terminal device through a first control channel on a first carrier, wherein the first configuration information is used for indicating a configuration on a second carrier, and the first carrier and the second carrier are different.

Optionally, as an implementation, the first configuration information is configuration information of a second control channel on the second carrier.

Optionally, as an implementation, the first control channel is a common control channel, and the second control channel is a UE-specific control channel of the terminal device.

Optionally, as an implementation, the first configuration information includes at least one of serial number information of a time domain scheduling unit in which the second control channel is located, information of a resource used by the second control channel, and information of a numerology used by the second control channel.

Optionally, as an implementation, the first configuration information is resource configuration information of resources of the second carrier.

Optionally, the first configuration information may include at least one of structure information of a time domain scheduling unit within resources of the second carrier, reserved resource information of resources of the second carrier, and resource pool information of resources of the second carrier.

Optionally, as an implementation, the first control channel carries indication information used for indicating a serial number of a time domain scheduling unit corresponding to the first configuration information.

Optionally, as an implementation, the time domain scheduling unit includes a time slot, a mini-slot, or a sub-frame.

The network device 900 according to the implementation of the present disclosure may perform the method 200 for transmitting information according to the implementation of the present disclosure, and the above and other operations and/or functions of various units in the network device 900 are respectively for implementing the corresponding flows of the various methods mentioned above, which will not be described here in detail for sake of conciseness.

The network device 900 according to the implementation of the present disclosure sends first configuration information to a terminal device through a first control channel on a first carrier, wherein the first configuration information is used for indicating a configuration on a second carrier, and the first carrier and the second carrier are different. The network device 900 does not need to transmit a common control channel on each carrier, thus saving the overhead of common control channel.

Figure 10:
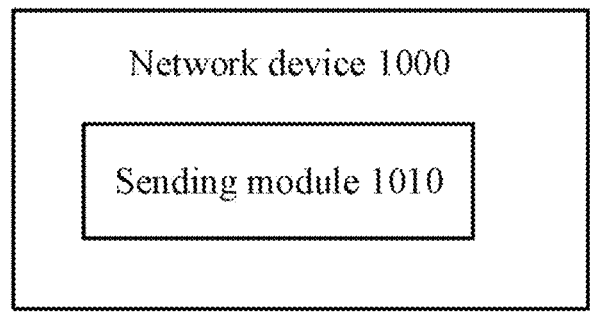
FIG. 10 is a schematic block diagram of a network device according to another implementation of the present disclosure.

FIG. 10 shows a network device 1000 according to another implementation of the present disclosure. As shown in FIG. 10, the network device 1000 includes a sending module 1010.

The sending module 1010 is used for sending first configuration information to a terminal device through system information on a first carrier, wherein the first configuration information is used for indicating a configuration on a second carrier, and the first carrier and the second carrier are different.

Optionally, as an implementation, the first configuration information is configuration information of a control channel on the second carrier.

Optionally, as an implementation, the first configuration information includes at least one of serial number information of a time domain scheduling unit in which the control channel is located, information of a resource used by the control channel, and information of a numerology used by the control channel.

Optionally, as an implementation, the first configuration information is resource allocation information of resources of the second carrier.

Optionally, as an implementation, the first configuration information may include at least one of structure information of a time domain scheduling unit within resources of the second carrier, reserved resource information of resources of the second carrier, and resource pool information of resources of the second carrier.

Optionally, as an implementation, the system information carries indication information used for indicating a serial number of a time domain scheduling unit corresponding to the first configuration information.

Optionally, as an implementation, the time domain scheduling unit includes a time slot, mini-slot, or a sub-frame.

The network device 1000 according to the implementation of the present disclosure may perform the method 500 for transmitting information according to the implementation of the present disclosure, and the above and other operations and/or functions of various units in the network device 1000 are respectively for implementing the corresponding flows of the various methods mentioned above, which will not be described here in detail for sake of conciseness.

Therefore, the network device 1000 according to the implementation of the present disclosure sends the first configuration information to a terminal device through system information on a first carrier, wherein the first configuration information is used for indicating the configuration on a second carrier, and the first carrier and the second carrier are different. The network device does not need to send all of system information on each carrier, thus saving the overhead of the system information.

Figure 11:
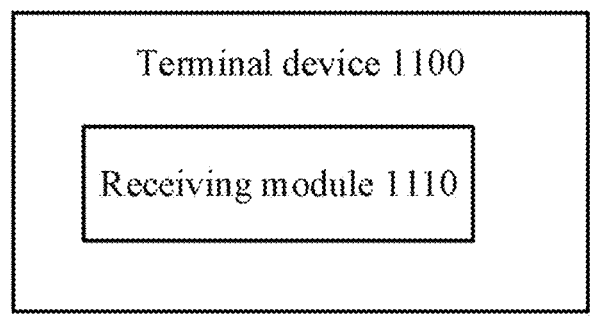
FIG. 11 is a schematic block diagram of a terminal device according to an implementation of the present disclosure.

Now, a terminal device according to an implementation of the present disclosure will be described. FIG. 11 shows a terminal device 1100 according to an implementation of the present disclosure. For sake of conciseness, some similar terms, definitions or concepts will not be repeated. As illustrated in FIG. 11, the terminal device 1100 includes a receiving module 1110.

The receiving module 1110 is used for receiving first configuration information sent by a network device through a first control channel on a first carrier, wherein the first configuration information is used for indicating a configuration on a second carrier, and the first carrier and the second carrier are different.

The receiving module 1110 is further used for: receiving the first configuration information sent by the network device through the first control channel on the first carrier, wherein the first configuration information is resource configuration information of resources of the second carrier.

The terminal device 1100 according to the implementation of the present disclosure may perform the method 700 for transmitting information according to the implementation of the present disclosure, and the above and other operations and/or functions of various units in the terminal device 1100 are respectively for implementing the corresponding flows of the various methods mentioned above, which will not be described here in detail for sake of conciseness.

Therefore, the terminal device 1100 according to the implementation of the present disclosure receives first configuration information sent by a network device through a first control channel on a first carrier, wherein the first configuration information is used for indicating the configuration on the second carrier, and the first carrier is different from the second carrier, and the overhead of common control channel can be saved and the power of the terminal device can be saved.

Figure 12:
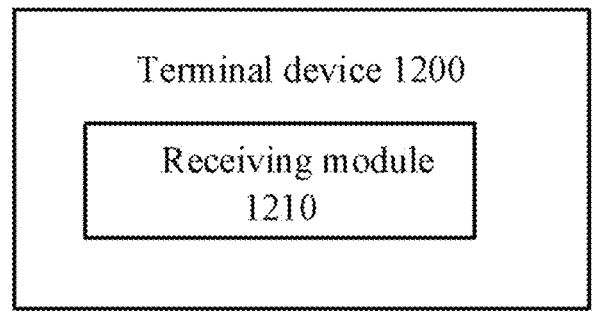
FIG. 12 is a schematic block diagram of a terminal device according to another implementation of the present disclosure.

FIG. 12 shows a terminal device 1200 according to an implementation of the present disclosure. For sake of conciseness, some similar terms, definitions or concepts will not be repeated. As illustrated in FIG. 12, the terminal device 1200 includes a receiving module 1210.

The receiving module 1210 is used for receiving first configuration information sent by a network device through system information on a first carrier, wherein the first configuration information is used for indicating a configuration on a second carrier, and the first carrier and the second carrier are different.

The terminal device 1200 according to the implementation of the present disclosure may perform the method 800 for transmitting information according to the implementation of the present disclosure, and the above and other operations and/or functions of various units in the terminal device 1200 are respectively for implementing the corresponding flows of the various methods mentioned above, which will not be described here in detail for sake of conciseness.

Therefore, the terminal device 1200 according to the implementation of the present disclosure receives the first configuration information sent by a network device through the system information on the first carrier, wherein the first configuration information is used for indicating the configuration on the second carrier, and the first carrier and the second carrier are different. The terminal device may receive the first configuration information sent by the network device through the system information on the first carrier, so as to obtain configurations of multiple carriers according to the first configuration information, thus avoiding a detection of the system information of the multiple carriers, reducing the complexity of the terminal device, and saving the power of the terminal device.

Figure 13:
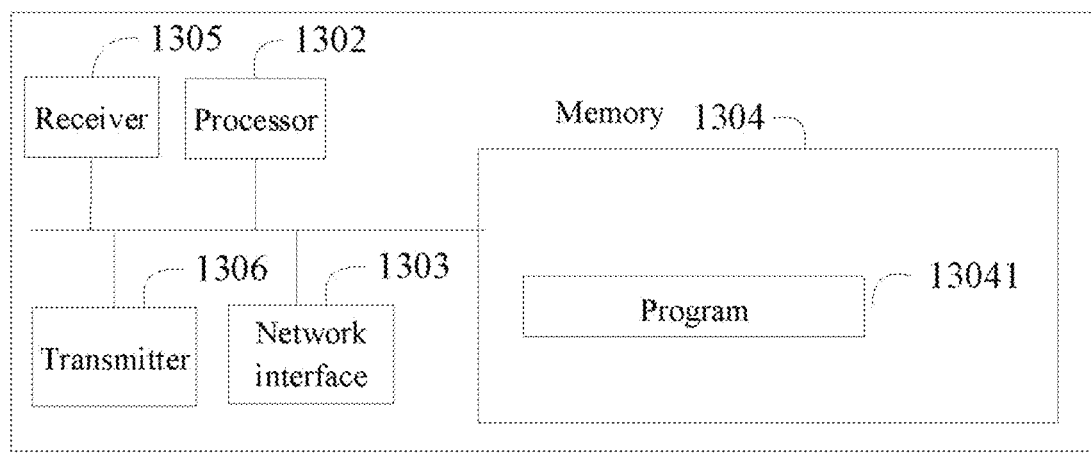
FIG. 13 is a structural block diagram of a network device provided according to an implementation of the present disclosure.

FIG. 13 shows a structure of a network device provided according to an implementation of the present disclosure, which includes at least one processor 1302 (e.g., CPU), at least one network interface 1303 or another communication interface, and a memory 1304. Optionally, the network device may also include a receiver 1305 and a transmitter 1306. The processor 1302 is used for executing an executable module, such as a computer program, stored in the memory 1304. The memory 1304 may include high-speed Random Access Memory (RAM) or non-volatile memory, such as at least one disk memory. Communication connection with at least one of other network elements is realized through at least one network interface 1303 (which may be wired or wireless). Receiver 1305 and transmitter 1306 are used for transmitting various signals or information.

In some implementations, the memory 1304 stores a program 13041 that may be executed by the processor 1302 for implementing a method of a network device side of an implementation of the present disclosure described above.

In an implementation of the present disclosure, the transmitter 1306 sends first configuration information to a terminal device through a first control channel on a first carrier, wherein the first configuration information is used for indicating a configuration on a second carrier, and the first carrier and the second carrier are different.

Figure 14:
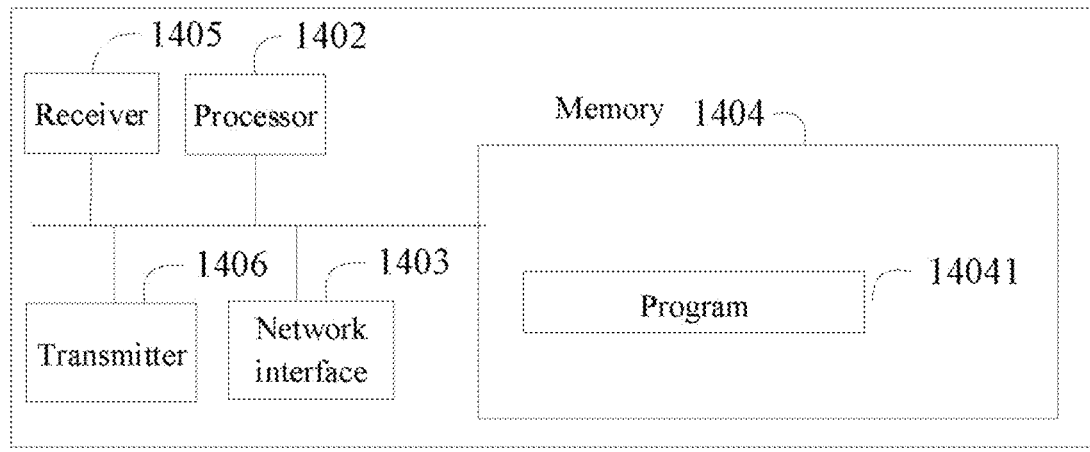
FIG. 14 is a structural block diagram of a network device provided according to an implementation of the present disclosure.

FIG. 14 shows a structure of a network device provided according to another implementation of the present disclosure, which includes at least one processor 1402 (e.g., CPU), at least one network interface 1403 or another communication interface, and a memory 1404. Optionally, the network device may also include a receiver 1405 and a transmitter 1406. The processor 1402 is used for executing an executable module, such as a computer program, stored in the memory 1404. The memory 1404 may include high-speed Random Access Memory (RAM) or non-volatile memory, such as at least one disk memory. Communication connection with at least one of other network elements is realized through at least one network interface 1403 (which may be wired or wireless). Receiver 1405 and transmitter 1406 are used for transmitting various signals or information.

In some implementations, the memory 1404 stores a program 14041, which may be executed by the processor 1402 for implementing a method of a network device side of an implementation of the present disclosure described above.

In an implementation of the present disclosure, the transmitter 1406 sends first configuration information to a terminal device through system information on a first carrier, wherein the first configuration information is used for indicating a configuration on a second carrier, and the first carrier and the second carrier are different.

Figure 15:
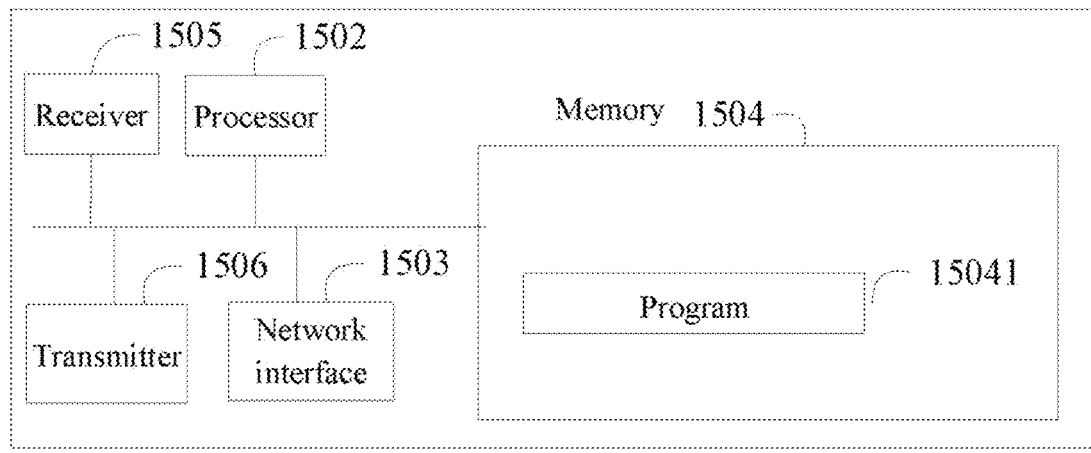
FIG. 15 is a structural block diagram of a terminal device provided according to another implementation of the present disclosure.

FIG. 15 shows a structure of a terminal device provided according to another implementation of the present disclosure, which includes at least one processor 1502 (e.g., CPU), at least one network interface 1503 or another communication interface, and a memory 1504. Optionally, the terminal device may also include a receiver 1505 and a transmitter 1506. The processor 1502 is used for executing an executable module, such as a computer program, stored in the memory 1504. The memory 1504 may include high-speed Random Access Memory (RAM) or non-volatile memory, such as at least one disk memory. Communication connection with at least one of other network elements is realized through at least one network interface 1503 (which may be wired or wireless). Receiver 1505 and transmitter 1506 are used for transmitting various signals or information.

In some implementations, the memory 1504 stores a program 15041 that can be executed by the processor 1502 for implementing a method of a terminal device side of an implementation of the present disclosure described above.

In an implementation of the present disclosure, the receiver 1505 receives first configuration information sent by a network device through a first control channel on a first carrier, wherein the first configuration information is used for indicating a configuration on a second carrier, and the first carrier and the second carrier are different.

Figure 16:
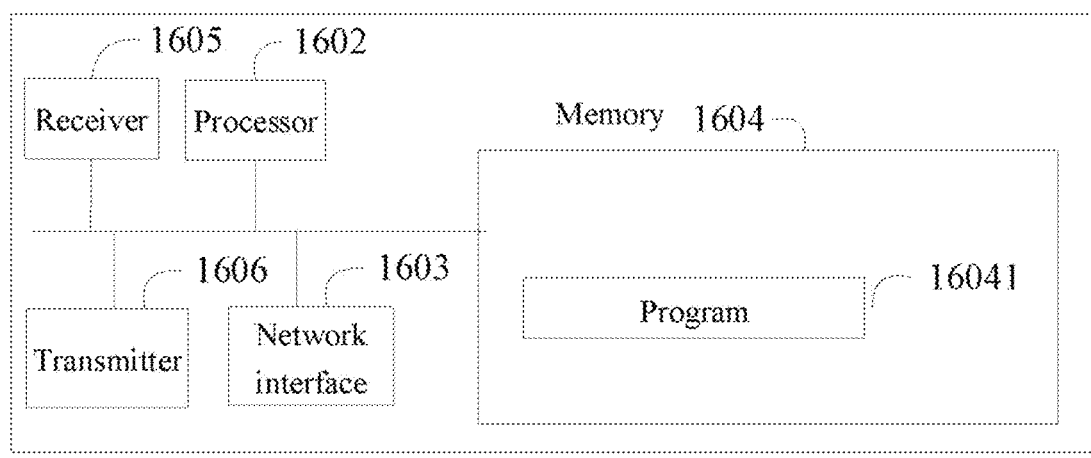
FIG. 16 is a structural block diagram of a terminal device provided according to yet another implementation of the present disclosure.

FIG. 16 shows a structure of a terminal device provided according to an implementation of the present disclosure, which includes at least one processor 1602 (e.g., CPU), at least one network interface 1603 or another communication interface, and a memory 1604. Optionally, the terminal device may also include a receiver 1605 and a transmitter 1606. The processor 1602 is used for executing executable modules, such as computer programs, stored in the memory 1604. The memory 1604 may include high-speed Random Access Memory (RAM) or non-volatile memory, such as at least one disk memory. Communication connection with at least one of other network elements is realized through at least one network interface 1603 (which may be wired or wireless). Receiver 1605 and transmitter 1606 are used for transmitting various signals or information.

In some implementations, the memory 1604 stores a program 16041 that can be executed by the processor 1602 for implementing a method of the terminal device side of an implementation of the present disclosure described above.

In an implementation of the present disclosure, the receiver 1605 receives first configuration information sent by a network device through system information on a first carrier, wherein the first configuration information is used for indicating a configuration on a second carrier, and the first carrier and the second carrier are different.

It should be understood that in various implementations of the present disclosure, values of sequence numbers in the above-mentioned processes do not imply an order of execution, and an order of execution of each process should be determined by its function and internal logic, and should not constitute any limitation on an implementation process of the implementation of the present disclosure.

Those of ordinary skill in the art will recognize that the exemplary elements and algorithm acts described in connection with the implementations disclosed herein can be implemented in electronic hardware, or a combination of computer software and electronic hardware. Whether these functions are performed in hardware or software depends on the specific application and design constraints of the technical solution. Skilled in the art may use different methods to implement the described functions for each particular application, but such implementation should not be considered to be beyond the scope of implementations of the present disclosure.

Those skilled in the art can clearly understand that for convenience and conciseness of description, corresponding processes in the aforementioned method implementations may be referred to for the specific working processes of the system, device, and unit described above, which are not repeated here.

In several implementations provided according to the present disclosure, it should be understood that the disclosed system, apparatus and method may be implemented in other ways. For example, the apparatus implementations described above are only illustrative, for example, the division of the units is only a logical function division, and there may be other division manners in actual implementation. For example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be electrical, mechanical or in other forms.

The unit described as a separate component may or may not be physically separated, and the component shown as a unit may or may not be a physical unit, i.e., it may be located in one place or may be distributed over multiple network units. Some or all of the units may be selected according to practical needs to achieve a purpose of implementations.

In addition, various functional units in various implementations of the present disclosure may be integrated in one processing unit, or various units may be physically present separately, or two or more units may be integrated in one unit.

The functions may be stored in a computer readable storage medium if implemented in a form of software functional units and sold or used as a separate product. Based on this understanding, the technical solution of implementations of the present disclosure, in essence, or the part contributing to the related art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure. The aforementioned storage media include various media capable of storing program codes such as U disk, mobile hard disk, read-only memory (ROM), random access memory (RAM), magnetic disk or optical disk.

The foregoing are merely specific implementation modes of implementations of the present disclosure, but the protection scope of implementations of the present disclosure is not limited thereto. Any person skilled in the art can easily conceive changes or substitutions within the technical scope disclosed by implementations of the present disclosure, which should be included within the protection scope of implementations of the present disclosure. Therefore, the protection scope of implementations of the present disclosure should be subject to the protection scope of the claims.

What we claim is:

1. A method for transmitting information, comprising:
   sending, by a network device, first configuration information to a terminal device through a first control channel on a first carrier, wherein the first configuration information is used for indicating a configuration on a second carrier, wherein the first carrier and the second carrier are different, wherein the first control channel is a common control channel, wherein the first configuration information comprises information of a structure of a time slot within resources of the second carrier, and wherein the structure of the time slot within the resources of the second carrier comprises an uplink resource part and a downlink resource part, and wherein the first control channel carries indication information used for indicating a serial number of the time slot corresponding to the first configuration information.

2. A method for transmitting information, comprising:
   receiving, by a terminal device, first configuration information sent by a network device through a first control channel on a first carrier, wherein the first configuration information is used for indicating a configuration on a second carrier, wherein the first carrier and the second carrier are different, wherein the first control channel is a common control channel, wherein the first configuration information comprises information of a structure of a time slot within resources of the second carrier, and wherein the structure of the time slot within the resources of the second carrier comprises an uplink resource part and a downlink resource part, and wherein the first control channel carries indication information used for indicating a serial number of the time slot corresponding to the first configuration information.

3. A network device, comprising: a processor, a memory, and a communication interface, wherein the processor is connected with the memory and the communication interface, the memory is used for storing instructions, the processor is used for executing the instructions, and the communication interface is used for communicating with other network elements under control of the processor, when the processor executes the instructions stored in the memory, the execution causes the processor to send first configuration information to a terminal device through a first control channel on a first carrier, wherein the first configuration information is used for indicating a configuration on a second carrier, wherein the first carrier and the second carrier are different, wherein the first control channel is a common control channel, wherein the first configuration information comprises information of a structure of a time slot within resources of the second carrier, and wherein the structure of the time slot within the resources of the second carrier comprises an uplink resource part and a downlink resource part, and wherein the first control channel carries indication information used for indicating a serial number of the time slot corresponding to the first configuration information.

4. A terminal device, comprising: a processor, a memory, and a communication interface, wherein the processor is connected with the memory and the communication interface, the memory is used for storing instructions, the processor is used for executing the instructions, and the communication interface is used for communicating with other network elements under control of the processor, when the processor executes the instructions stored in the memory, the execution causes the processor to receive first configuration information sent by a network device through a first control channel on a first carrier, wherein the first configuration information is used for indicating a configuration on a second carrier, wherein the first carrier and the second carrier are different, wherein the first control channel is a common control channel, wherein the first configuration information comprises information of a structure of a time slot within resources of the second carrier, and wherein the structure of the time slot within the resources of the second carrier comprises an uplink resource part and a downlink resource part, and wherein the first control channel carries indication information used for indicating a serial number of the time slot corresponding to the first configuration information.

* * * * *